United States Patent
Zhang et al.

(10) Patent No.: US 11,500,535 B2
(45) Date of Patent: Nov. 15, 2022

(54) TWO STROKE QUICK INPUT SELECTION

(71) Applicant: Lenovo (Singapore) Pte. Ltd., Singapore (SG)

(72) Inventors: Jianbang Zhang, Cary, NC (US); Matthew Lloyd Hagenbuch, Durham, NC (US); John Weldon Nicholson, Cary, NC (US); Scott Edwards Kelso, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 312 days.

(21) Appl. No.: 14/926,373

(22) Filed: Oct. 29, 2015

(65) Prior Publication Data
US 2017/0123647 A1  May 4, 2017

(51) Int. Cl.
| | |
|---|---|
| *G06F 3/04883* | (2022.01) |
| *G06F 40/171* | (2020.01) |
| *G06F 3/023* | (2006.01) |
| *G06F 3/0482* | (2013.01) |
| *G06F 3/04842* | (2022.01) |

(52) U.S. Cl.
CPC ........ *G06F 3/04883* (2013.01); *G06F 3/0236* (2013.01); *G06F 3/0482* (2013.01); *G06F 3/04842* (2013.01); *G06F 40/171* (2020.01)

(58) Field of Classification Search
CPC .................................................. G06F 3/04883
USPC ........................................................ 715/863
See application file for complete search history.

(56) References Cited

U.S. PATENT DOCUMENTS

| | | | | |
|---|---|---|---|---|
| 5,455,901 | A * | 10/1995 | Friend ................. | G06V 30/373 |
| | | | | 382/187 |
| 5,471,578 | A | 11/1995 | Moran et al. | |
| 5,583,946 | A | 12/1996 | Gourdol | |
| 5,809,267 | A * | 9/1998 | Moran .................. | G06V 30/36 |
| | | | | 715/863 |
| 6,525,749 | B1 * | 2/2003 | Moran .................. | G06F 40/166 |
| | | | | 345/173 |
| 6,678,864 | B1 * | 1/2004 | Tsai ...................... | H04L 63/083 |
| | | | | 715/229 |
| 8,952,912 | B1 * | 2/2015 | Hock .................... | G06F 3/0488 |
| | | | | 345/173 |
| 2003/0156145 | A1 * | 8/2003 | Hullender ........... | G06F 3/04883 |
| | | | | 715/863 |
| 2005/0229117 | A1 | 10/2005 | Hullender et al. | |
| 2007/0174761 | A1 * | 7/2007 | Lin ....................... | G06F 40/169 |
| | | | | 715/205 |

(Continued)

FOREIGN PATENT DOCUMENTS

| | | |
|---|---|---|
| CN | 102455863 A | 5/2012 |
| CN | 103365570 A | 10/2013 |

(Continued)

*Primary Examiner* — Daniel Rodriguez

(74) *Attorney, Agent, or Firm* — Ference & Associates LLC

(57) ABSTRACT

One embodiment provides a method, including: accepting, at an input surface of an electronic device, ink strokes; determining, using a processor of the electronic device, that the ink strokes include a selection indicator pair; associating, using a processor of the electronic device, the selection indicator pair with content; and selecting, using a processor of the electronic device, the content associated with the selection indicator pair. Other aspects are described and claimed.

12 Claims, 3 Drawing Sheets

(56) References Cited

U.S. PATENT DOCUMENTS

| | | | |
|---|---|---|---|
| 2009/0267923 A1* | 10/2009 | Van Schaack | G06F 3/0317 345/179 |
| 2012/0023399 A1* | 1/2012 | Hoshino | G06F 40/242 715/256 |
| 2012/0092269 A1* | 4/2012 | Tsai | G06F 3/04883 345/173 |
| 2012/0139853 A1* | 6/2012 | Kano | G06F 3/04842 345/173 |
| 2012/0263381 A1* | 10/2012 | Yoshida | G06F 3/038 382/188 |
| 2013/0124513 A1* | 5/2013 | Bignert | G06F 16/958 707/E17.082 |
| 2013/0169570 A1* | 7/2013 | Kamii | G06F 3/041 345/173 |
| 2013/0212498 A1* | 8/2013 | Lim | G06F 16/9577 715/760 |
| 2014/0143664 A1 | 5/2014 | Tsang et al. | |
| 2014/0173473 A1* | 6/2014 | Hicks | G06F 3/04883 715/764 |
| 2014/0173484 A1* | 6/2014 | Hicks | G06F 3/04842 715/769 |
| 2014/0189482 A1* | 7/2014 | Hill | G06F 40/18 715/212 |
| 2015/0186351 A1* | 7/2015 | Hicks | G06F 3/0482 715/232 |
| 2015/0234799 A1* | 8/2015 | Cho | G06F 3/04883 715/708 |
| 2017/0109032 A1* | 4/2017 | MéLinand | G06F 40/166 |

FOREIGN PATENT DOCUMENTS

| | | |
|---|---|---|
| CN | 104050158 A | 9/2014 |
| EP | 0667567 A2 | 8/1995 |

\* cited by examiner

TWO STROKE QUICK INPUT SELECTION

BACKGROUND

Electronic devices such as laptops, tablets, and smart phones are used in connection with input surfaces, e.g., a touch screen or a digitizer. Users are offered an opportunity to provide handwritten input to the device, e.g., ink strokes forming letters, words, numbers, and other characters or symbols (herein simply ink strokes or characters).

While faithful identification of characters included in handwritten input has progressed quickly, the use of ink strokes remains somewhat difficult. A particular pain point that remains is that of selecting content using handwritten inputs.

BRIEF SUMMARY

In summary, one aspect provides a method, comprising: accepting, at an input surface of an electronic device, ink strokes; determining, using a processor of the electronic device, that the ink strokes include a selection indicator pair; associating, using a processor of the electronic device, the selection indicator pair with content; and selecting, using a processor of the electronic device, the content associated with the selection indicator pair.

Another aspect provides an electronic device, comprising: an input surface; a processor operatively coupled to the input surface; a memory device comprising instructions executable by the processor to: accept, via the input surface, ink strokes; determine that the ink strokes include a selection indicator pair; associate the selection indicator pair with content; and select the content associated with the selection indicator pair.

A further aspect provides a product, comprising: a storage device having code stored therewith, the code being executable by a processor and comprising: code that accepts, at an input surface of an electronic device, ink strokes; code that determines, using a processor of the electronic device, that the ink strokes include a selection indicator pair; code that associates, using a processor of the electronic device, the selection indicator pair with content; and code that selects, using a processor of the electronic device, the content associated with the selection indicator pair.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
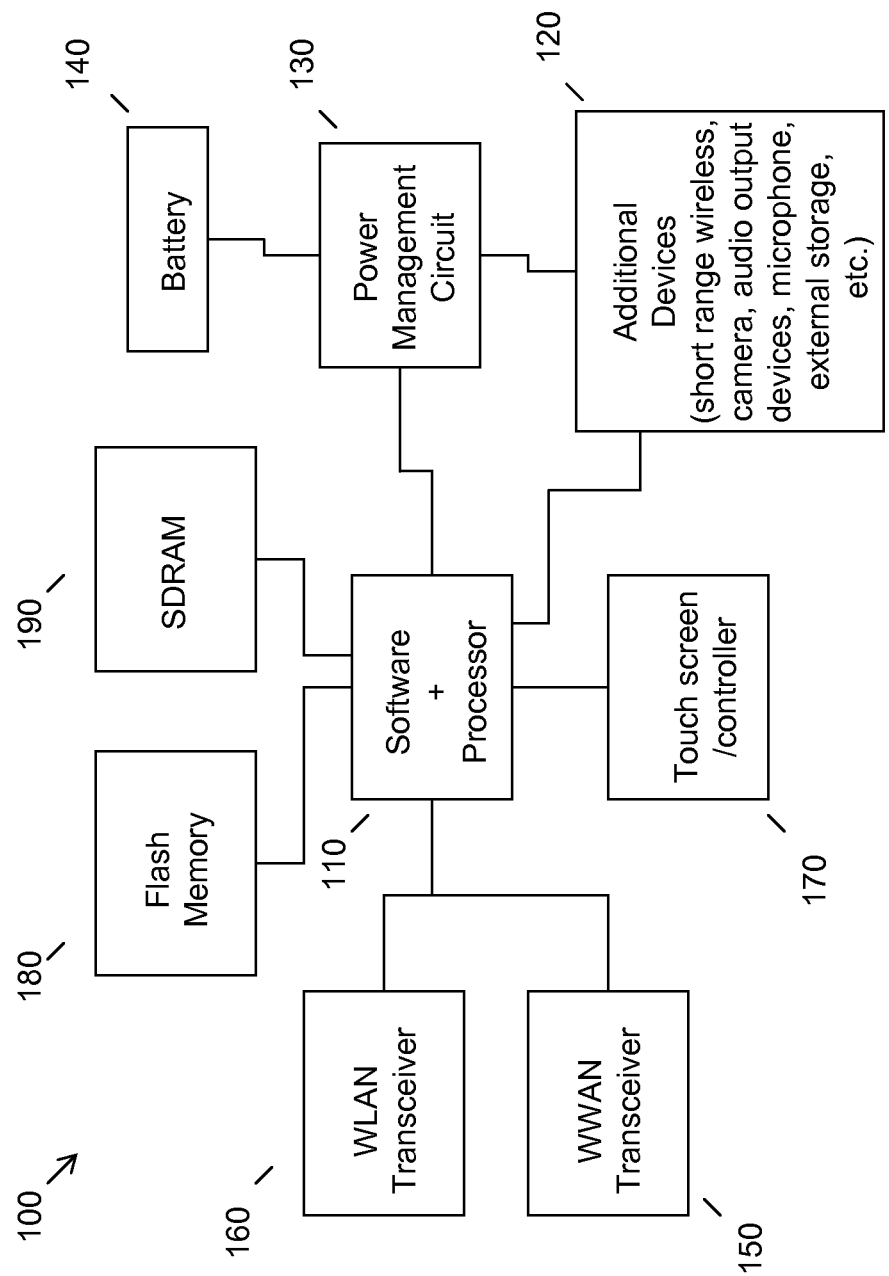
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

A user may enter handwriting input ("ink strokes," inclusive of letters, numbers, symbols and other characters) to an input surface, e.g., a touch screen. A user may provide the ink strokes to the input surface using a finger tip, a pen or a stylus, or a combination thereof. While input systems, e.g., input method editors (IMEs) and application programs supporting handwriting inputs and gestures, are efficient and accurate with respect to identification of the characters, and thus the identification of words and even sentences/paragraphs, a difficulty remains in faithfully replicating a user's experience with physical paper. In one example, editing input ink strokes remains difficult. Currently technology limits the user to use of a particular techniques, e.g., drawing a lasso around content (whether handwritten or not) to be selected (e.g., for formatting, copying, cutting, etc., the ink strokes lassoed). While this works well for small, in-line content selection, users are left to operate using conventional methods (e.g., keyboard or cursor based selections) if more than a word or two is to be selected.

Accordingly, an embodiment provides for a quick, two stroke selection of content. The two stroke selection allows the user to bound any amount of content. An embodiment allows a user to draw a pair of strokes (termed herein a selection indicator pair), and all the content in between the characters of the selection indicator pair will be selected.

The selection indicator pair may take a variety of forms. For example, two stroke gestures may include pairs such as bracket pairs, e.g., "[" and "]" or "(" and ")", single point angle characters such as "<" and ">" or any other desired characters, e.g., box drawing symbols such as "L" and "⌐". A selection indicator pair ⌐ may include matched characters (e.g., left and right brackets) or mismatched pairs (e.g., left square bracket "[" and right curly bracket "}"). It is noted that these are non-limiting examples based on characters that mimic the appearance of physically written bracketing symbols, i.e., those used commonly on physical paper.

All of these character pairs can be easily recognized using handwriting or gesture recognition technology, which may thereafter take an appropriate action (e.g., text selection followed by a cut or copy action, a formatting action, a display of a user interface, etc., as indicated by default and/or further user input). For text selection, the rule for handling a two stroke selection may be the same as Shift+ two click in a WINDOWS operating environment. In this example, the location of two strokes of the selection indicator pair equals the cursor position of two-click function.

For handwritten content (ink stroke) selection, ink layout information may be required to provide an accurate selection. That is, if a user wishes to place a first of the characters of the selection indicator pair in one line of text, and the second of the characters of the selection indicator pair in another line of text, an indication that the lines of text are logically associated (e.g., vertical lines of a paragraph or consecutive paragraphs), and thus bounded by the selection indicator pair, is required. There are existing technologies to do ink stroke layout analysis to identify a paragraph, a list, a line, a sentence, a word, a table, and a letter format or other formats. MICROSOFT Corp., for example, has applied such technology in handwriting enabled applications such as MICROSOFT ONENOTE and MICROSOFT POWERPOINT applications. There are additional technologies available to perform handwriting layout analysis. With such technologies, the ink stroke layout information can be identified and used to assist in determining which ink strokes are related and therefore should be selected using a two stroke selection indicator.

The selection action using the selection indicator pair across lines (of a paragraph, of consecutive pages, etc.) may also work in a similar fashion as Shift+two click used in WINDOWS operating system to highlight/select text across multiple words, lines, paragraphs and pages. For example, if two brackets of a selection indicator pair are in the same line, only this line of ink strokes between brackets will be selected. If two brackets of a selection indicator pair are in the same paragraph, across multiple lines of ink strokes, all the lines between the brackets in this paragraph will be selected. Similar formatting associations between the locations of a selection indicator pair (which may include more than two ink strokes) and tables, graphics, etc., may be used to select these content types.

With the input selection methods offered by an embodiment, it is very easy to select a large body of content. This is especially true if the user has to go beyond single page to select the content of interest, i.e., in situations where a lasso or other conventional technique fails. While various examples using lines (sentences, paragraphs, consecutive paragraphs, etc.) are used herein, it is noted that table selection (and selection in like formatted documents or document parts) may be achieved using similar techniques. By way of example, for a table selection, based on the location of two ink strokes forming the selection indicator pair, a cell, a column or a row of content in a table may be automatically identified and selected.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a wireless wide area network (WWAN) transceiver 150 and a wireless local area network (WLAN) transceiver 160 for connecting to various networks, such as telecommunications networks (WAN) and wireless Internet devices, e.g., access points offering a Wi-Fi® connection. Additionally, devices 120 are commonly included, e.g., short range wireless communication devices, such as a BLUETOOTH radio, a BLUETOOTH LE radio, a near field communication device, etc., as further described herein. System 100 often includes a touch screen 170 for data input and display/rendering, e.g., registering handwritten ink strokes provided by a finger tip, a pen or stylus, or both. System 100 also typically includes various memory devices, for example flash memory 180 and SDRAM 190.

Figure 2:
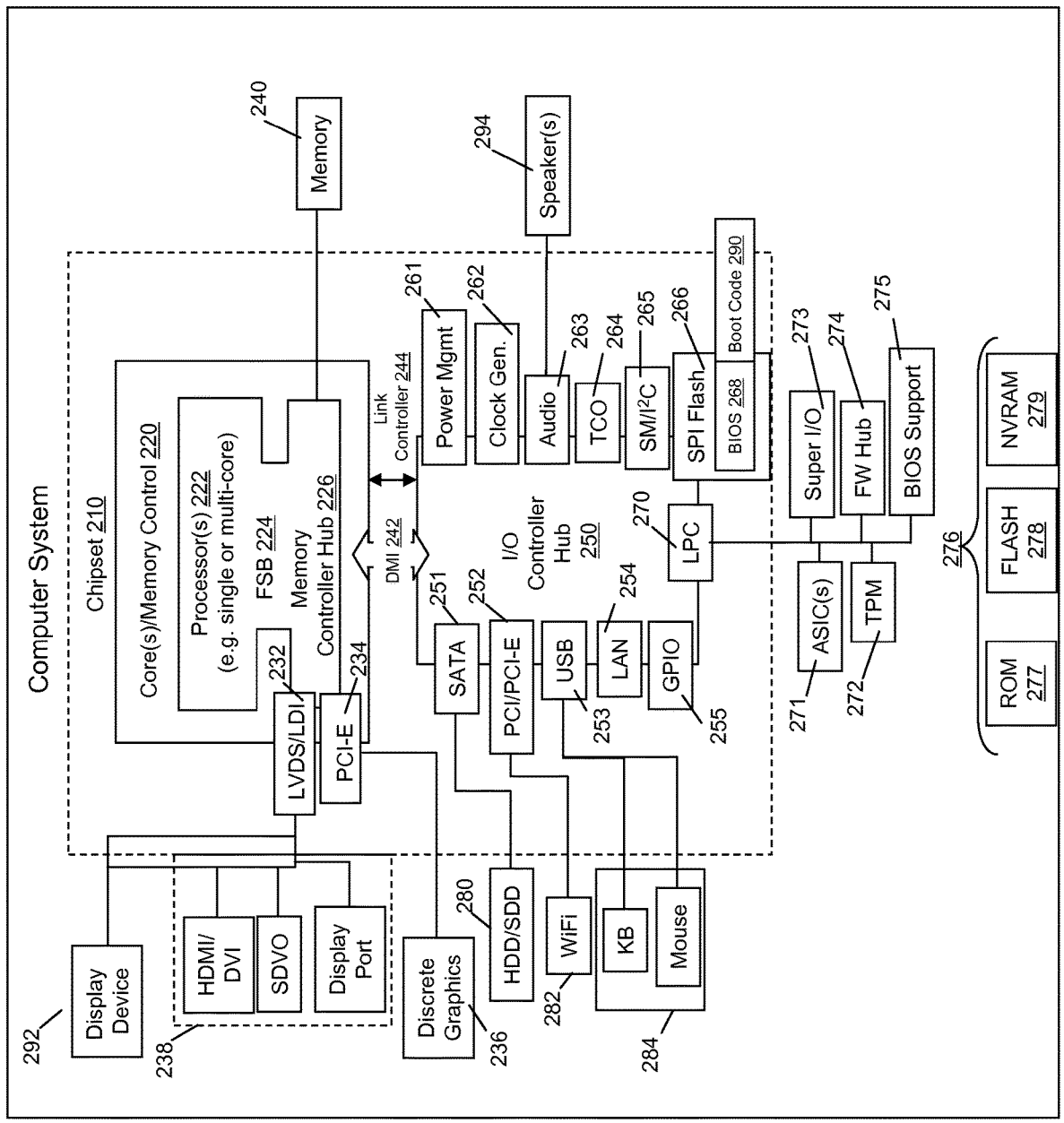
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, and personal computer devices generally. In some cases, certain device circuitry, e.g., that of FIG. 1, will include devices such as an input surface in the form of a touch screen 170. Whereas in other devices, e.g., a laptop computer, the circuitry (such as that outlined in FIG. 2) may include another input surface, e.g., a digitizer or like input surface offering handwriting input capability. An embodiment may be implemented in either of these devices, and others, such that an appropriate handling of user handwritten ink strokes is enabled, as described herein.

Figure 3:
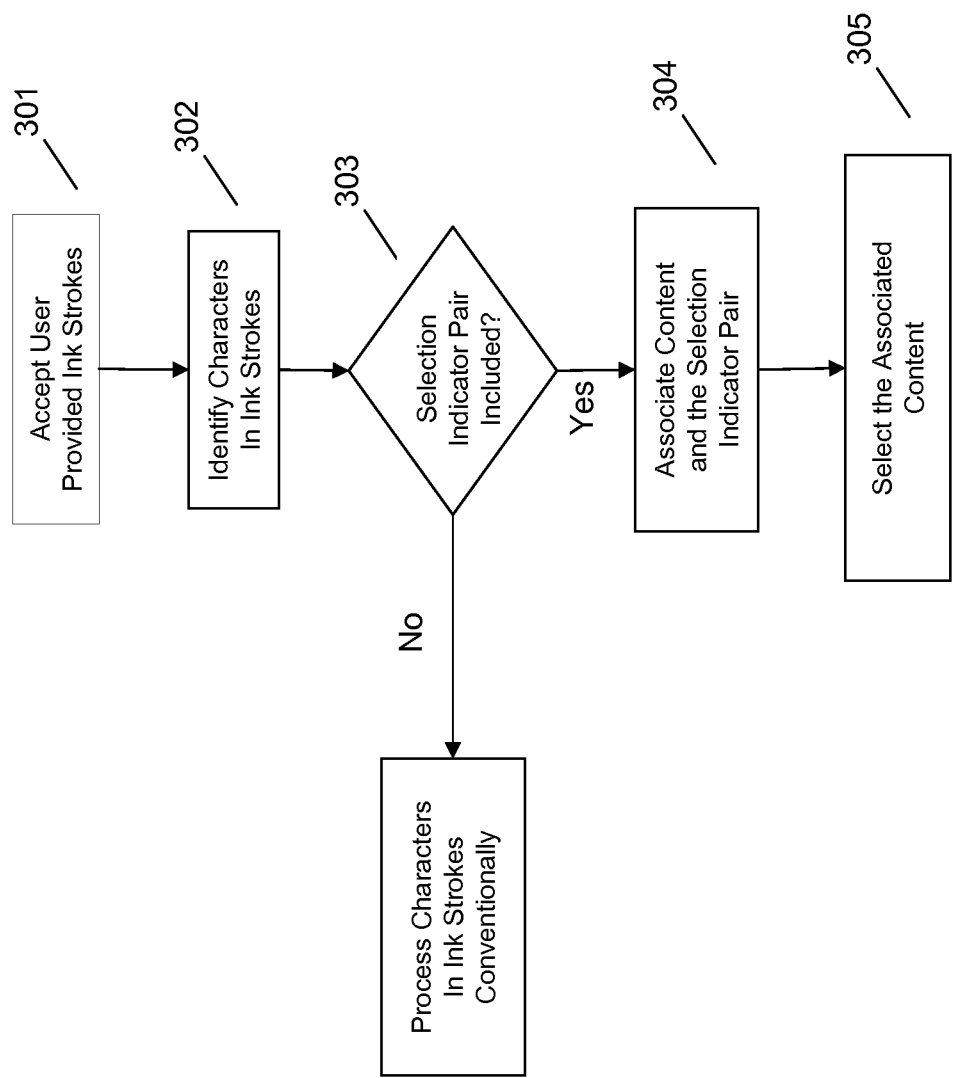
FIG. 3 illustrates an example of two stroke input selection.

Referring to FIG. 3, an example of an input method editor operating according to the various text selection techniques is illustrated. In an embodiment, at 301 user provided ink strokes (e.g., pen handwriting input provided to a touch screen of a tablet computing device) are accepted, e.g., via processing with an IME or other application. This processing includes identification of the input ink strokes in terms of identifying one or more characters in the ink strokes at 302. For example, a user may enter a sentence, a paragraph, or multiple paragraphs or pages of handwriting input. Further, the accepted ink strokes at 301 and identification thereof at 302 may take place multiple times. By way of example, a user may first enter substantive text and thereafter enter a selection indicator pair, e.g., brackets provided around the words of a sentence or sentences of a previously entered paragraph. Alternatively, a user may be providing only the selection indicator pair at 301 to select previously input or provided content, e.g., non-handwritten text of a word processing document, a web page, or a table entry or graphic, etc.

An embodiment determines at 303 if the characters include a selection indicator pair at 303. If the user is providing other handwritten inputs, this may include re-evaluating a previously input character, e.g., if two of two brackets used to form a text selection indicator pair bounding a sentence. Alternatively, an embodiment may determine that substantive text has been input, followed by the provi-sion of a selection indicator pair, e.g., brackets provided to bound previously input handwritten ink strokes. Further, as above, an embodiment may determine that the ink strokes accepted at 301 have been provided in association with other content, e.g., a user providing a selection indicator pair to select text of a web page, etc.

If no selection indicator pair is detected, e.g., as determined at 303, then an embodiment may continue to process the ink strokes as conventionally known, i.e., input the ink strokes as machine text, provide the ink strokes as graphical input into an application, etc. However, if it is determined at 303 that two of the characters of the ink strokes form a selection indicator pair, an embodiment may differentially process these and/or other ink strokes, as illustrated at 304 and 305 of FIG. 3.

By way of example, an embodiment may associate the content with the characters of the text selection pair at 304. In an embodiment, the locations of the text selection indicator pair characters are related to the content. For example, a user may have bounded a logical sentence of content by a leading bracket placed before the first character of the first word of a sentence, and the placement of a second bracket at or near the end of the logical sentence. Again, if the content includes prior handwritten content, handwriting input technology is able to interpret the ink strokes into logical segments or sections, e.g., sentences, paragraphs, etc. Thus, an embodiment is capable of using the location information of the placement of the characters recognized as a selection indicator pair to identify ink strokes associated therewith, e.g., bounded by the selection indicator pair characters.

The associated content may then be selected at 305. Thus, a user may bound a sentence, a paragraph, or parts thereof, even if on different pages within the document, such that this content is selected. Thus, the selection indicator pair may bound multiple vertical lines of handwritten ink strokes or other content. As will be appreciated by those having ordinary skill in the art, with respect to handwritten content selection, the literal ink strokes may be selected and/or a machine text representation may be selected, or both.

In an embodiment, the associating at 304 includes determining that the selection indicator pair bounds the content (e.g., one or more ink strokes) by virtue of the on-screen coordinates of the selection indicator pair with respect to the intervening characters. The selection indicator pair may include a pair of brackets, a pair of parentheses, a pair of single pointing angle marks, a pair of quotation marks, or a pair of box drawing characters. Other suitable characters may likewise be utilized to bound the text in a visually distinguishable way (for the user) such that an embodiment may associate content with the pair. As described herein, the selection indicator pair may be composed of the same or different characters.

An embodiment may provide, e.g., using a display screen of the electronic device, a user interface for confirming a selection action. Thus, a user may be offered the opportunity to confirm that a selection indicator pair has indeed been entered (for example, as opposed to a standard, non-selection use of brackets, etc.), an opportunity to confirm that the selection indicator pair locations have been accurately identified, and/or an opportunity to refine the identification and/or location of the selection indicator pair. It will be appreciated that this may be accomplished via a GUI provided, e.g., on-screen (such as via a GUI displayed on a touch screen of a device). Moreover, an embodiment may provide within the interface a variety of editing or other options for handling the selected content (e.g., copying, cutting, pasting, formatting (e.g., underlining, italicizing, changing the color, highlighting, etc.)).

An embodiment therefore provides a technical improvement to a user input interface by making it much simpler to select content using handwritten input. This improves the operation of the device itself in terms of user friendliness, the speed at which content may be selected using ink stroke based selection (for editing and the like), as well as expanding the amount and type of content, particularly with respect to selection of handwritten input, that may be selected in line (i.e., using a handwritten ink stroke selection pair).

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, electromagnetic, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a magnetic storage device, or any suitable combination of the foregoing. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

The invention claimed is:

1. A method, comprising:
  accepting, at an input surface of an electronic device, ink strokes, wherein the ink strokes are editing ink strokes;
  determining, using a processor of the electronic device, that the ink strokes include a selection indicator pair, wherein the selection indicator pair comprises two characters, each character of the two characters selected from the group consisting of: a bracket, a parenthesis, a single pointing angle mark, a quotation mark, and a box drawing character and wherein the selection indicator pair is composed of different mismatched characters;
  associating, using a processor of the electronic device, the selection indicator pair with content, wherein the associating comprises identifying content bounded by the selection indicator pair and selecting a grouping of content associated with the content bounded by the selection indicator pair, wherein the selecting the grouping comprises identifying content that is logically associated with other content bounded by the selection indicator pair and including the content that is logically associated with the other content within the grouping; and
  selecting, without additional user input for entering a text selection mode and using a processor of the electronic device, the content associated with the selection indicator pair and, thereafter, performing an additional action with respect to the selected text;
  wherein the content is handwriting input;
  wherein the identifying comprises utilizing on-screen coordinates for each ink stroke included in the selection indicator pair.

2. The method of claim 1, wherein the selection indicator pair bounds multiple vertical lines of the content.

3. The method of claim 2, wherein the multiple vertical lines belong to a single paragraph.

4. The method of claim 2, wherein the multiple vertical lines traverse multiple pages.

5. The method of claim 1, further comprising providing an indication of selected content.

6. The method of claim 1, further comprising providing, using a display screen of the electronic device, a user interface for confirming a selection action.

7. An electronic device, comprising:

an input surface;

a processor operatively coupled to the input surface;

a memory device comprising instructions executable by the processor to:

accept, via the input surface, ink strokes, wherein the ink strokes are editing ink strokes;

determine that the ink strokes include a selection indicator pair, wherein the selection indicator pair comprises two characters, each character of the two characters selected from the group consisting of: a bracket, a parenthesis, a single pointing angle mark, a quotation mark, and a box drawing character and wherein the selection indicator pair is composed of different mismatched characters;

associate the selection indicator pair with content, wherein to associate comprises to identify content bounded by the selection indicator pair and selecting a grouping of content associated with the content bounded by the selection indicator pair, wherein the selecting the grouping comprises identifying content that is logically associated with other content bounded by the selection indicator pair and including the content that is logically associated with the other content within the grouping; and select, without additional user input for entering a text selection mode, the content associated with the selection indicator pair and, thereafter, performing an additional action with respect to the selected text wherein the content is handwriting input;

wherein the identifying comprises utilizing on-screen coordinates for each ink stroke included in the selection indication pair.

8. The electronic device of claim 7, wherein the selection indicator pair bounds multiple vertical lines of the content.

9. The electronic device of claim 8, wherein the multiple vertical lines belong to a single paragraph.

10. The electronic device of claim 8, wherein the multiple vertical lines traverse multiple pages.

11. The electronic device of claim 7, wherein the instructions are executable by the processor to provide an indication of selected content.

12. A product, comprising:

a storage device having code stored therewith, the code being executable by a processor and comprising:

code that accepts, at an input surface of an electronic device, ink strokes, wherein the ink strokes are editing ink strokes;

code that determines, using a processor of the electronic device, that the ink strokes include a selection indicator pair, wherein the selection indicator pair comprises two characters, each character of the two characters selected from the group consisting of: a bracket, a parenthesis, a single pointing angle mark, a quotation mark, and a box drawing character and wherein the selection indicator pair is composed of different mismatched characters;

code that associates, using a processor of the electronic device, the selection indicator pair with content, wherein the code that associates comprises code that identifies content bounded by the selection indicator pair and selecting a grouping of content associated with the content bounded by the selection indicator pair, wherein the content bounded by the selection indicator pair comprises associating on-screen coordinates for each ink stroke comprised in the selection indicator pair, wherein the selecting the grouping comprises identifying content that is logically associated with other content bounded by the selection indicator pair and including the content that is logically associated with the other content within the grouping; and code that selects, without additional user input for entering a text selection mode, the content associated with the selection indicator pair and, thereafter, performing an additional action with respect to the selected text wherein the content is handwriting input;

wherein the identifying comprises utilizing on-screen coordinates for each ink included in the selection indicator pair.

* * * * *